(12) United States Patent
Park et al.

(10) Patent No.: US 10,087,892 B1
(45) Date of Patent: Oct. 2, 2018

(54) ASSEMBLING SUPPORT FOR CANISTER OF VEHICLE

(71) Applicant: LEEHAN CORPORATION, Hwaseong (KR)

(72) Inventors: Min Young Park, Suwon (KR); Cheong Yong Cho, Siheung (KR)

(73) Assignee: LEEHAN CORPORATION, Hwaseong (KR)

( * ) Notice: Subject to any disclaimer, the term of this patent is extended or adjusted under 35 U.S.C. 154(b) by 0 days.

(21) Appl. No.: 15/881,469

(22) Filed: Jan. 26, 2018

Related U.S. Application Data (63) Continuation of application No. 15/707,979, filed on Sep. 18, 2017.

(30) Foreign Application Priority Data

Mar. 16, 2017 (KR) ........................ 10-2017-0033010

(51) Int. Cl.
*F02M 25/08* (2006.01)
*F01N 3/08* (2006.01)
*B01D 53/02* (2006.01)

(52) U.S. Cl.
CPC ......... *F02M 25/0854* (2013.01); *B01D 53/02* (2013.01); *F01N 3/0807* (2013.01); *F01N 3/0835* (2013.01); *B01D 2253/102* (2013.01); *B01D 2253/104* (2013.01);
(Continued)

(58) Field of Classification Search
CPC . F02M 25/0854; F01N 3/0835; F01N 3/0807; B01D 53/02; B01D 2253/102; B01D 2259/4516; B01D 2253/104; B01D 2257/702; B01D 2253/106
See application file for complete search history.

(56) References Cited

U.S. PATENT DOCUMENTS 6,171,556 B1 * 1/2001 Burk ................. B01D 53/9481
422/171
2001/0025484 A1 * 10/2001 Ueno .................... F01N 3/0814
60/277
(Continued)

FOREIGN PATENT DOCUMENTS

JP    6171556 B2 * 8/2017 ........ H02M 3/33507
KR  20010025484 A * 4/2001
(Continued)

*Primary Examiner* — Joseph Dallo (57) ABSTRACT

An assembled support for supporting an adsorbent according to an embodiment of the present invention may include two or more core members configured to be coupled in the longitudinal direction and configured to include: a cylindrical body configured to have a plurality of first partitions formed therein to enable ventilation; at least one pair of first coupling protrusions configured to be provided on the rim of one end of the body to face each other; and at least one pair of first coupling protrusion receiving portions configured to be provided on the rim of the other end of the body to face each other, wherein the first coupling protrusions of one core member are received in the first coupling protrusion receiving portions of another core member in order to thereby couple the core members to each other, and wherein the surfaces of the core members are coated with hydrocarbon adsorbents.

4 Claims, 8 Drawing Sheets

(52) U.S. Cl.
CPC .. *B01D 2253/106* (2013.01); *B01D 2257/702* (2013.01); *B01D 2259/4516* (2013.01)

(56) References Cited

U.S. PATENT DOCUMENTS

| | | | |
|---|---|---|---|
| 2005/0061301 A1* | 3/2005 | Meiller | F02M 25/0854 123/519 |
| 2007/0113831 A1* | 5/2007 | Hoke | B01D 53/02 123/519 |
| 2009/0101119 A1* | 4/2009 | Ammermann | F02M 25/0836 123/519 |
| 2010/0316538 A1* | 12/2010 | Buelow | B01J 20/103 422/177 |
| 2014/0230796 A1* | 8/2014 | Brock | F02M 25/0854 123/520 |

FOREIGN PATENT DOCUMENTS

| | | | | |
|---|---|---|---|---|
| KR | 20050061301 A | * | 6/2005 | ......... B01L 3/50825 |
| KR | 10-2007-0053331 A | | 5/2007 | |
| KR | 20070113831 A | * | 11/2007 | |
| KR | 10-2008-0080552 A | | 9/2008 | |
| KR | 20090101119 A | * | 9/2009 | ....... H01L 21/30608 |
| KR | 10-1685498 B1 | | 12/2016 | |

* cited by examiner

ASSEMBLING SUPPORT FOR CANISTER OF VEHICLE

CROSS REFERENCE TO RELATED APPLICATION PARAGRAPH

This application is a continuation of and claims priority to U.S. application No. 15/707,979 filed Sep. 18, 2017, which claims the priority benefit of Korean Patent Application No. 10-2017-0033010, filed on Mar. 16, 2017 in the Korean Intellectual Property Office, the disclosures of which are incorporated herein by reference.

BACKGROUND OF THE INVENTION

1. Field of the invention

The present invention relates to a support, and more particularly, to an assembled support for supporting an adsorbent that is applied to a canister apparatus of a vehicle in order to adsorb evaporated hydrocarbons.

2. Description of the Prior Art

Evaporation gases generated from the vehicle cause diurnal breathing loss (DBL) while the vehicle is parked, hot soak loss (HSL) when the vehicle is stopped after driving, and running loss (RL) while the vehicle is being driven. The increasing development of eco-friendly vehicles brings about a gradual increase in the battery usage and a gradual decrease in the operation of an engine. The result thereof is decreased engine purging activity. A canister system installed in the vehicle requires modification thereto due to such reduction in the amount of engine purge.

Figure 1:
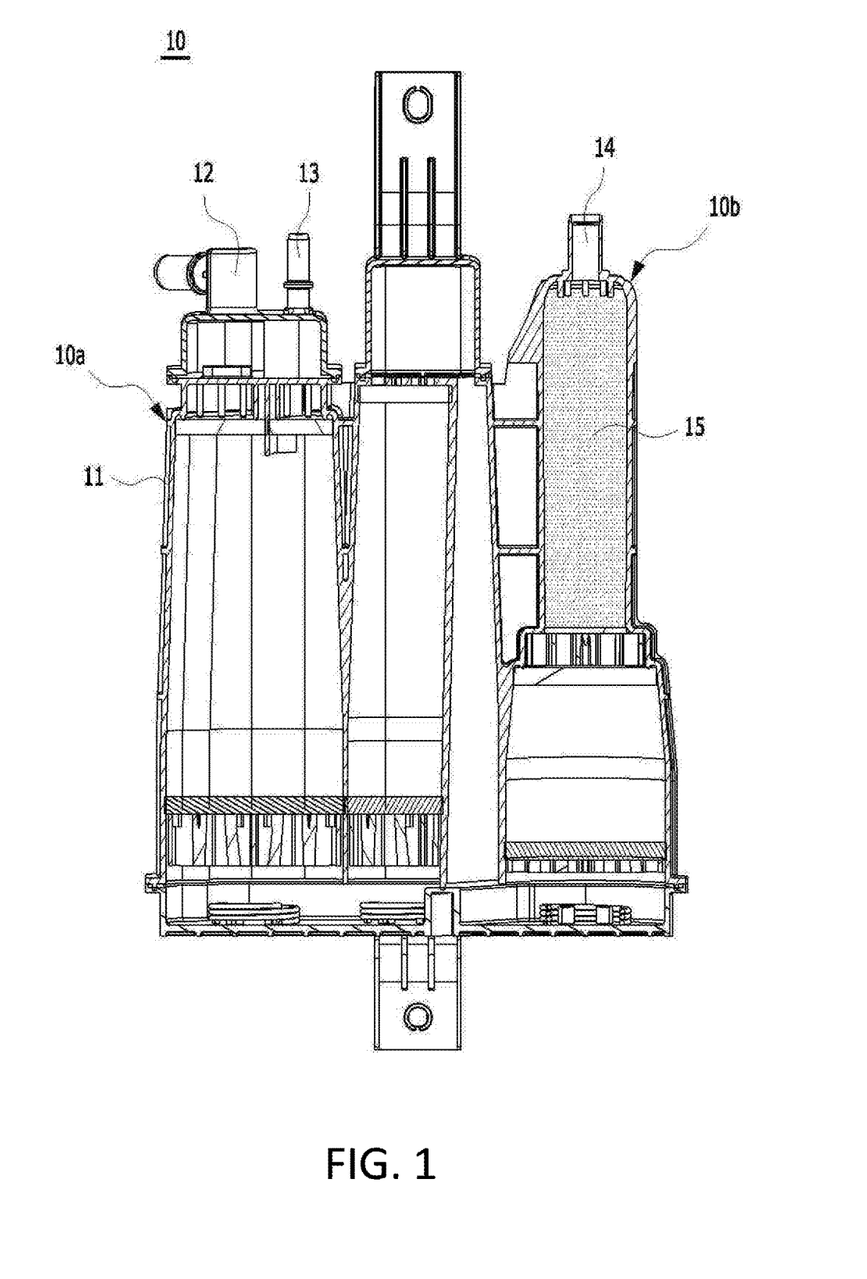
FIG. 1 is a view schematically illustrating a typical vehicle canister.

FIG. 1 is a view schematically showing a conventional canister 10 of a vehicle. Referring to FIG. 1, the canister 10 has a housing 11 filled with activated carbon. An inlet 12, an outlet 13, and an air inlet 14 are formed in the upper portion of the housing 11. The inlet 12 is a passage through which evaporation gases flow from a fuel tank. The outlet 13 is a passage through which evaporation gases are discharged to an intake of an engine during the operation of the engine. The air inlet 14 is a passage for introducing air from the outside into the canister 10 or discharging evaporation gases adsorbed onto the activated carbon to the outside when the engine is turned off.

Recently, the housing 11 of the canister 10 has been changed to adopt a main canister 10a and an auxiliary canister 10b. The main canister 10a adsorbs and stores evaporation gases on activated carbon stored therein. The auxiliary canister 10b re-collects the evaporation gases that have not been collected by the main canister 10a in order to thereby collect the hydrocarbon in redundant manner. The auxiliary canister 10b is used in order to conform to US environmental regulations, such as LEV-III and PZEV, Chinese environmental regulations, Korean environmental regulations (KLEV3), and the like. The main canister 10a and the auxiliary canister 10b are installed so as to communicate with each other. As shown in FIG. 1, the main canister 10a and the auxiliary canister 10b may be integrally formed with internal compartments. Alternatively, the housing of the auxiliary canister 10b may be separated from the housing of the main canister 10a, and they may be configured to communicate with each other.

Meanwhile, a honeycomb-type monolith support coated with a hydrocarbon adsorbent is often employed as a collecting member disposed in the auxiliary canister 10b. Such a monolith support is generally formed of ceramic or metal. In an embodiment, the monolith support is formed in a cylindrical shape and is provided with honeycomb-type air vents therein. A hydrocarbon adsorbent is coated on the surfaces of the air vents in order to thereby collect hydrocarbons passing through the monolith support. The performance of the monolith support depends on the length and width (such as the diameter) of the monolith support, the number or density of air vents, and the like, as well as the hydrocarbon adsorbent.

The problem is that there are as many types of canisters as there are vehicles. The shape of the canister varies with the model of the car. If the shape of the canister is changed, the length and width (such as a diameter) of the monolith support provided in the canister are required to be designed differently. However, the cost of the monolith support is relatively high. Thus, it is very difficult to manufacture monolith supports optimized for each canister type in manufacturing various types of canisters because of the increase in the cost thereof.

[Patent References]
Patent 1: Korean Patent No. 10-0762051 (published on Aug. 18. 2004)

SUMMARY OF THE INVENTION

The present invention provides a support for a canister of a vehicle, which can be assembled to have a desired length and width (or diameter) and can facilitate the application of two or more kinds of hydrocarbon adsorbents because a plurality of members are formed to be coupled.

According to an aspect of the present invention, there is provided an assembled support for supporting an adsorbent, which may include two or more core members configured to be coupled in the longitudinal direction and configured to include: a cylindrical or polygonal body configured to have a plurality of first partitions formed therein to enable ventilation; at least one pair of first coupling protrusions configured to be provided on the rim of one end of the body so as to face each other; and at least one pair of first coupling protrusion receiving portions configured to be provided on the rim of the other end of the body to face each other, wherein the first coupling protrusions of one core member are received in the first coupling protrusion receiving portions of another core member in order to thereby couple the core members to each other, and wherein the surfaces of the core members are coated with hydrocarbon adsorbents.

At this time, the core member may further include at least one pair of first protrusions configured to be formed on an outer surface of the body along the longitudinal direction thereof so as to face each other.

According to another aspect of the present invention, there is provided an assembled support for supporting an adsorbent, which may include two or more cladding members configured to be coupled in the longitudinal direction and configured to include: a cylindrical or polygonal inner body configured to have a hollow therein; a cylindrical or polygonal outer body configured to receive the inner body therein with a space therebetween, and configured to have a plurality of second partitions formed in the space to enable ventilation; at least one pair of second coupling protrusions configured to be provided on the rim of one end of the outer body to face each other; at least one pair of second coupling protrusion receiving portions configured to be provided on the rim of the other end of the outer body to face each other; and at least one pair of receiving grooves configured to be formed on an inner surface of the inner body along the longitudinal direction thereof so as to face each other, wherein the second coupling protrusions of one cladding member are received in the second coupling protrusion receiving portions of another cladding member in order to thereby couple the cladding members to each other, and wherein the surfaces of the cladding members are coated with hydrocarbon adsorbents.

At this time, the cladding member may further include at least one pair of second protrusions configured to be formed on an outer surface of the outer body along the longitudinal direction thereof so as to face each other.

Meanwhile, an inner surface of the inner body of the cladding member may be foiled to correspond to an outer surface of the body of the core member, and the core member and the cladding member may be coupled to each other in a manner such that the first protrusions of the core member are coupled to the receiving grooves of the cladding member so that the inner body of the cladding member receives the body of the core member.

In addition, the core member and the cladding member may be formed of a foamed plastic having flame retardancy, and the surfaces of one or more members selected from the core members and the cladding members are coated with a hydrocarbon adsorbent different from that coated on the surfaces of the remaining members that are not selected.

The assembled support for a canister of a vehicle, according to embodiments of the present invention, can provide supports having a variety of lengths depending on the size of a canister housing by allowing a plurality of core members or cladding members to be coupled in the longitudinal direction to form a support.

In addition, the width (or diameter) of the support can be adjusted by providing cladding members to be coupled to the outer surfaces of core members, thereby providing a support having various widths (or diameters) depending on the size of a canister housing. Therefore, since it can be applied to various types of canisters, price competitiveness is excellent.

In addition, since the core members and the cladding members are formed of a foamed plastic having flame retardancy, the manufacturing cost is lower than that of a ceramic or metal material, thereby contributing to price competitiveness of the product.

Further, since the support is manufactured by coupling the core member and the cladding member, which are coated with different kinds of hydrocarbon adsorbents, it is possible to easily realize an effect of improving the adsorption efficiency by means of a combination of two or more hydrocarbon adsorbents.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENTS

Hereinafter, the present invention will be described in detail with reference to the accompanying drawings. It should be understood that the following description is made of the present invention through a specific example, and that the technical spirit of the present invention is not limited thereto. In addition, the accompanying drawings are provided to help in understanding the present invention and the technical spirit of the present invention is not limited thereto.

Figure 2:
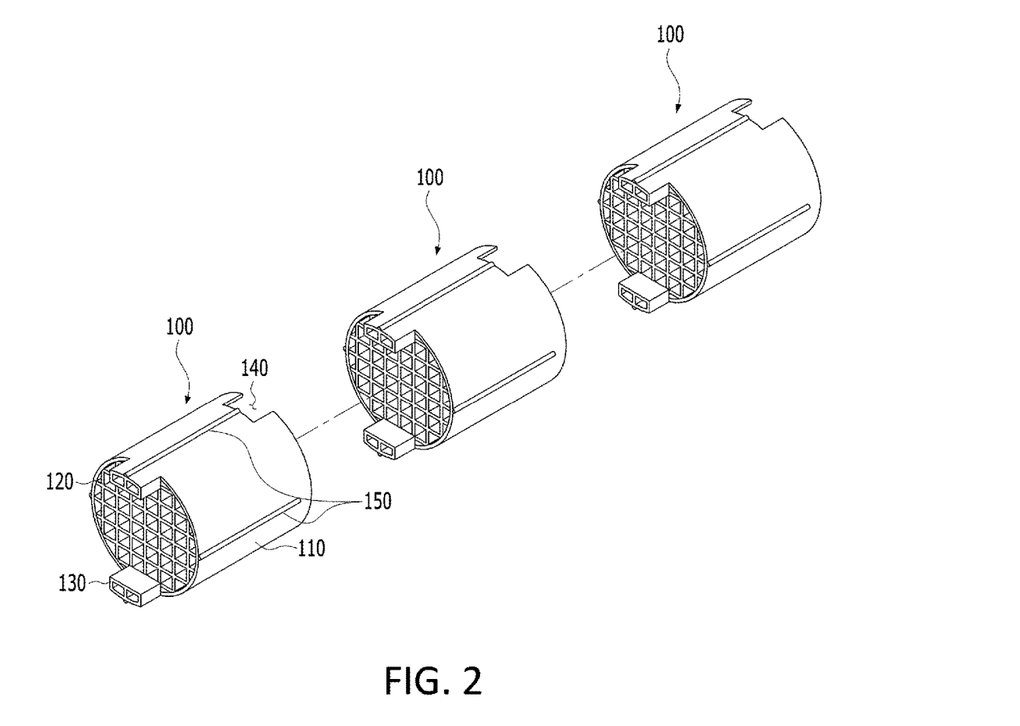
FIG. 2 is a view illustrating an example of core members in an assembled support for adsorbing hydrocarbons, according to an embodiment of the present invention.
Figure 3:
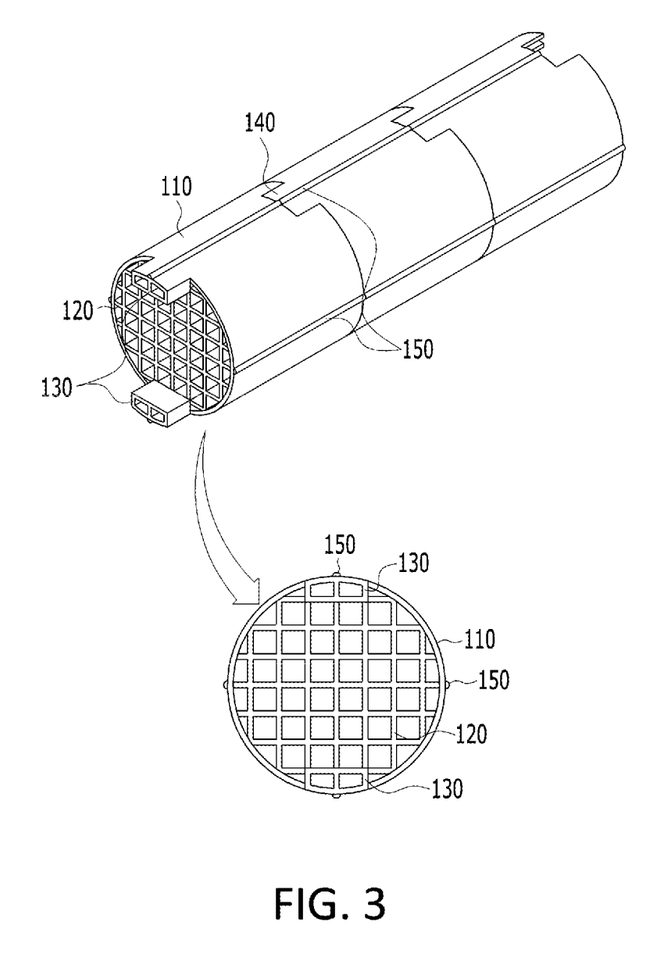
FIG. 3 is a view illustrating a support formed by coupling the core members of FIG. 2.
Figure 4A:
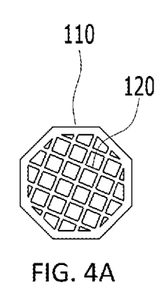
FIGS. 4A to 4F are views illustrating various modifications of a body and a first partition of the core member shown in FIG. 2.
Figure 4B:
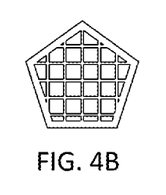
Figure 4C:
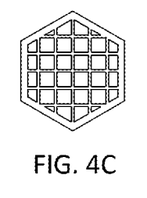
Figure 4D:
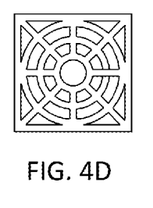
Figure 4E:
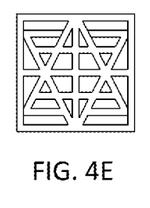
Figure 4F:
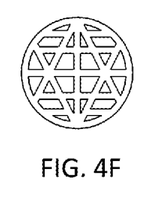

FIG. 2 is a view showing an example of core members 100 in an assembled support for adsorbing hydrocarbons (hereinafter, referred to as an assembled support), according to an embodiment of the present invention. FIG. 3 is a view illustrating a support formed by coupling a plurality of core members 100 of FIG. 2.

Referring to FIGS. 2 and 3, an assembled support, according to embodiments of the present invention, may be famed by coupling a plurality of core members 100 in the longitudinal direction. For example, the respective core members 100 of FIG. 2 may be longitudinally coupled to form an assembled support, as shown in FIG. 3. Although FIGS. 2 and 3 show three core members 100 and the coupled state thereof, any number of core members 100 greater than or equal to two may be coupled to each other, and the number thereof is not particularly limited. As described above, there are various types of canisters, and the length required for the assembled support for adsorbing hydrocarbons provided in the canister may vary depending thereon. The assembled support, according to the present invention, can be flexibly used for various kinds of canisters because the support can be formed to conform to the length required for the canister by coupling the core members 100.

Hereinafter, detailed components of the core member 100 will be described.

The core member 100 may include a body 110, at least one pair of first coupling protrusions 130 formed on the body 110, and at least one pair of first coupling protrusion receiving portions 140 formed on the body 110.

The body 110 may be formed in a cylindrical or polygonal shape. In this regard, FIGS. 2 and 3 show the body 110 formed in a cylindrical shape. A plurality of first partitions 120 may be formed on the inner side of the body 110.

In an embodiment, the plurality of first partitions 120 may be formed in the form of a honeycomb grid, thereby enabling ventilation therethrough. The size of the grid is not specified. For example, 16 to 180 vent holes may be formed through the grid on the basis of a cross-sectional circle of the body 110. As the number of vent holes is reduced close to 16, the size of the grid will be larger, and as the number of the vent holes increases close to 180, the size of the grid will be smaller.

At least one pair of first coupling protrusions 130 may be provided on the rim of one end of the body 110 so as to face each other. For example, the first coupling protrusions 130 may be formed in a manner such that protrusions having a predetermined height are provided on a part of the rim of one end of the body 110. Since the rim of the body 110 has a thickness, the protrusions can be provided. In an embodiment, the first coupling protrusions 130 may be integrally formed with the body 110. For example, the first coupling protrusions 130 may be formed in the upper and lower portions of a front end of the body 110, respectively, as shown in FIG. 2. Alternatively, unlike the configuration of FIG. 2, the first coupling protrusions may be formed in the upper, lower, left, and right portions of a front end of the body 110, respectively (two pairs in total). Like the body 110, a honeycomb-type partition may be formed in the first coupling protrusions 130, or may not be formed therein. The first coupling protrusions 130 are received in the first coupling protrusion receiving portions 140, which will be described later, whereby one core member 100 is coupled to another core member 100.

At least one pair of first coupling protrusion receiving portions 140 may be provided on the rim of the other end of the body 110 so as to face each other. For example, the first coupling protrusion receiving portion 140 may be formed in a manner such that a receiving groove having a depth is provided on a part of the rim of the other end of the body 110. Since the rim of the body 110 has a thickness, the receiving groove can be provided.

In an embodiment, the first coupling protrusion receiving portions 140 may be integrally formed with the body 110. For example, the first coupling protrusion receiving portions 140 may be formed in the upper and lower portions of a rear end of the body 110, respectively, as shown in FIG. 2. Alternatively, unlike the configuration of FIG. 2, the first coupling protrusion receiving portions may be formed in the upper, lower, left, and right portions of a rear end of the body 110, respectively (two pairs in total). Like the body 110, a honeycomb-type partition may be formed in the first coupling protrusion receiving portion 140.

In an embodiment, the first coupling protrusion receiving portion 140 may be formed at a position corresponding to the first coupling protrusion 130. For example, in the case where the first coupling protrusions 130 are formed in the upper and lower portions of a front end of the body 110, respectively, as shown in FIG. 2, the first coupling protrusion receiving portions 140 may be formed in the upper and lower portions of a rear end of the body 110, respectively. In addition, in the case where a honeycomb-type partition is formed in the first coupling protrusion 130, the first coupling protrusion receiving portion 140 may also have a honeycomb-type partition foiled therein. This is due to the fact that when a fluid flows through the honeycomb-type partition famed in the first coupling protrusion 130, the fluid proceeds toward the first coupling protrusion receiving portion 140. The first coupling protrusion receiving portion 140 receives the first coupling protrusion 130, whereby one core member 100 is coupled to another core member 100.

That is, in FIG. 2, the first coupling protrusions 130 of the core member 100 disposed at the center may be received in the first coupling protrusion receiving portions 140 of the core member 100 disposed at the front, so that the front core member 100 and the central core member 100 can be coupled. The core member 100 disposed at the rear and the core member 100 disposed at the center may be coupled in the same manner. The surfaces of the core members 100 may be coated with hydrocarbon adsorbents. Here, the surface of the core member 100 may include both the outer surface and the inner surface of the core member 100. The inner surface of the core member 100 may be all of the surfaces of the first partition 120. The hydrocarbon adsorbent has a function of adsorbing and collecting hydrocarbons of the evaporation gases passing through the core member 100. The hydrocarbon adsorbent will be described later in more detail.

The core members 100 may further include at least one pair of first protrusions 150. At least one pair of first protrusions 150 may be provided on the outer surface of the body 110 so as to face each other. For example, the first protrusion 150 may be formed in a manner such that a protrusion having a predetermined height is provided on the outer surface of the body 110 along the longitudinal direction thereof.

In an embodiment, the first protrusions 150 may be formed integrally with the body 110. For example, the first protrusions 150 may be formed at positions obtained by dividing the outer surface of the body 110 into four pieces, respectively, as shown in FIGS. 2 and 3. The first protrusions 150 are intended for use in coupling the cladding member, which will be described later, to the core member, and thus the front and rear ends of the first protrusion 150 may be rounded to facilitate insertion of the cladding member.

Meanwhile, the body 110 of the core member 100 may be formed in a polygonal shape rather than a cylindrical shape. In addition, the plurality of first partitions 120 may be formed in various shapes other than a honeycomb shape. In this regard, FIGS. 4A to 4F illustrate various modifications of the body 110 and the first partition 120. Of course, the body 110 and the first partition 120 may be formed in shapes other than those shown in FIGS. 4A to 4F.

Figure 5A:
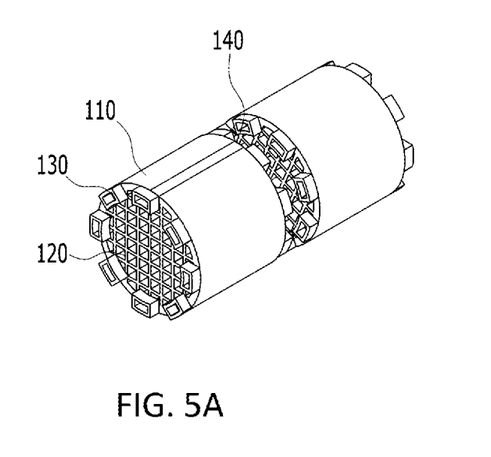
FIGS. 5A and 5B are views illustrating another modification of the core member of FIG. 2.
Figure 5B:
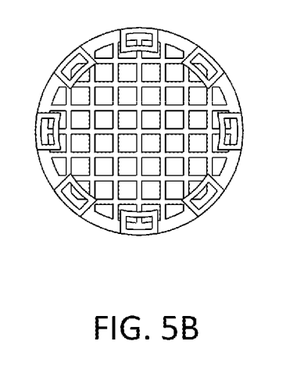

In addition, the body 110 of the core member 100 may be provided with a plurality of pairs of first coupling protrusions 130 and first coupling protrusion receiving portions 140. In this regard, FIGS. 5A and 5B are views showing another modification of the core member 100 shown in FIG. 2. FIGS. 5A and 5B show a case where four pairs of first coupling protrusions 130 and first coupling protrusion receiving portions 140 are provided on the body 110 of the core member 100 at an angular interval of 45 degrees.

In an embodiment, one core member 100 may be coupled to another core member 100 in the longitudinal direction such that the first partitions 120 of the respective core members 100 cross each other. For example, as shown in FIG. 5A, the core member 100 disposed in the front and the core member 100 disposed in the rear may be disposed to cross each other at about 45 degrees, and may then be coupled to each other. In this case, since the first partitions 120 formed in the front core member 100 and the first partitions 120 famed in the rear core member 100 cross each other as shown in FIG. 5B, a ventilation structure may be formed to be denser than a non-crossing structure.

Figure 6:
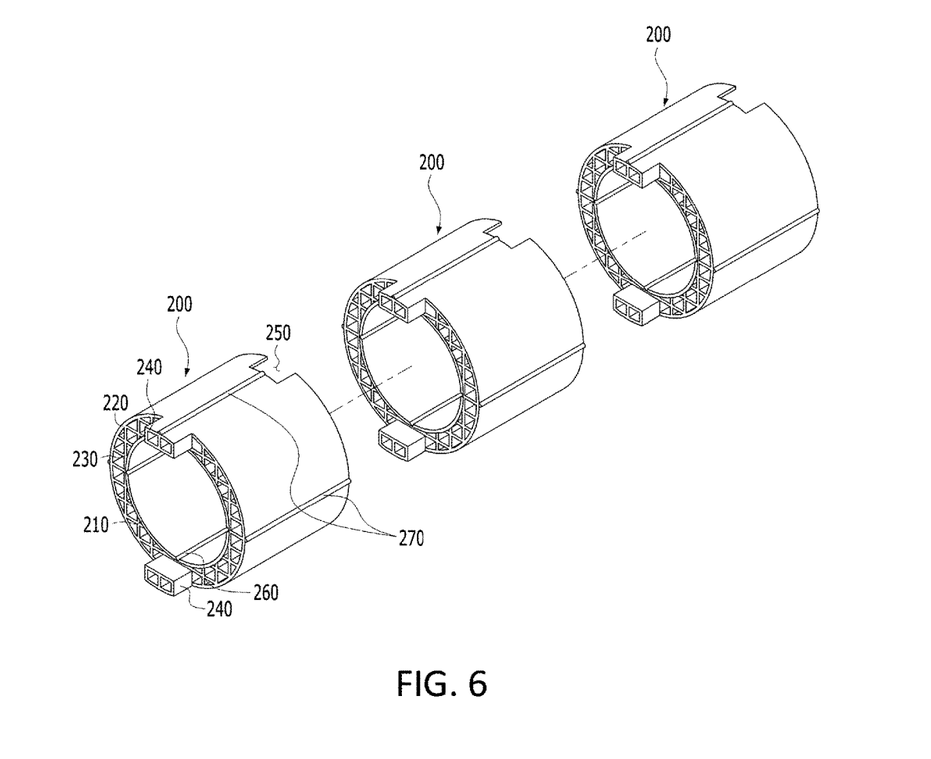
FIG. 6 is a view illustrating an example of cladding members in an assembled support for adsorbing hydrocarbons, according to an embodiment of the present invention.
Figure 7A:
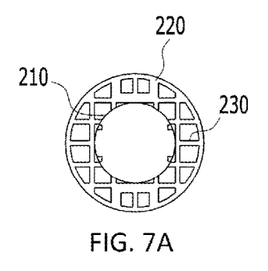
FIGS. 7A to 7E are views illustrating various modifications of a body and a second partition of the cladding member shown in FIG. 6.
Figure 7B:
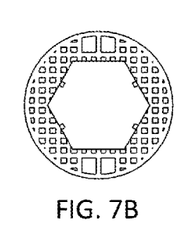
Figure 7C:
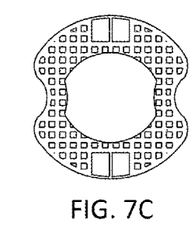
Figure 7D:
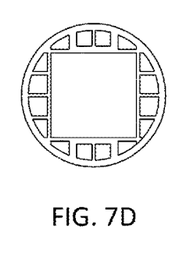
Figure 7E:
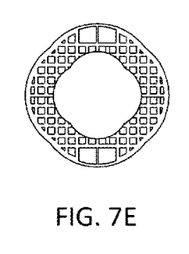

FIG. 6 is a view illustrating an example of cladding members in an assembled support for adsorbing hydrocarbons (hereinafter, referred to as an assembled support), according to an embodiment of the present invention.

Referring to FIG. 6, an assembled support, according to embodiments of the present invention, may be formed by coupling a plurality of cladding members 200 in the longitudinal direction. For example, the cladding members 200 of FIG. 6 may be coupled in the longitudinal direction in order to thereby form an assembled support. Although two cladding members 200 are shown in FIG. 6, two or more cladding members 200 may be coupled, and the number of cladding members is not particularly limited.

Hereinafter, detailed components of the cladding member 200 will be described.

The cladding member 200 may include an inner body 210, an outer body 220, at least one pair of second coupling protrusions 240 formed on the outer body 220, at least one pair of second coupling protrusion receiving portions 250 formed on the outer body 220, and at least one pair of receiving grooves 260 formed on the inner body 210.

The inner body 210 and the outer body 220 may be formed in a cylindrical or polygonal shape. In this regard, FIG. 6 shows the inner body 210 and the outer body 220 formed in a cylindrical shape. The inner body 210 may have a hollow therein. The outer body 220 may receive the inner body 210 therein. At this time, the inner body 210 may be received therein with a space therebetween. That is, when the inner body 210 is received in the outer body 220, a predetermined space may be formed between the outer surface of the inner body 210 and the inner surface of the outer body 220. In addition, a plurality of second partitions 230 may be formed in the space between the inner body 210 and the outer body 220. In an embodiment, the second partitions 230 may be partitioned in the form of a honeycomb grid to enable ventilation. The size of the grid is not specified. The larger the size of the grid, the smaller the number of vent holes that may be formed, and the smaller the size of the grid, the greater the number of vent holes that may be formed. The inner body 210, the outer body 220, and the second partitions 230, which are described above, may be integrally formed.

At least one pair of second coupling protrusions 240 may be provided on the rim of one end of the outer body 220 so as to face each other. For example, the second coupling protrusion 240 may be formed in a manner such that a protrusion having a predetermined height is provided on a part of the rim of one end of the outer body 220. Since the rim of the outer body 220 has a thickness, the protrusion can be provided.

In an embodiment, the second coupling protrusions 240 may be integrally famed with the outer body 220. For example, the second coupling protrusions 240 may be formed in the upper and lower portions of a front end of the outer body 220, respectively, as shown in FIG. 6. Alternatively, unlike the configuration of FIG. 6, the second coupling protrusions may be formed in the left and right portions of a front end of the outer body 220, respectively, or may be formed in the upper, lower, left, and right portions of a front end of the outer body 220, respectively (two pairs in total). A honeycomb-type partition may also be formed in the second coupling protrusion 240, or may not be formed therein. The second coupling protrusions 240 are received in the second coupling protrusion receiving portions 250, which will be described later, whereby one cladding member 200 is coupled to another cladding member 200.

At least one pair of second coupling protrusion receiving portions 250 may be provided on the rim of the other end of the outer body 220 so as to face each other. For example, the second coupling protrusion receiving portion 250 may be famed in a manner such that a receiving groove having a given depth is provided on a part of the rim of the other end of the outer body 220. Since the rim of the outer body 220 has a thickness, the receiving groove can be provided.

In an embodiment, the second coupling protrusion receiving portions 250 may be integrally formed with the outer body 220. For example, the second coupling protrusion receiving portions 250 may be formed in the upper and lower portions, respectively, of a rear end of the outer body 220 as shown in FIG. 6. Alternatively, unlike the configuration of FIG. 6, the second coupling protrusion receiving portions may be formed in the left and right portions of a rear end of the outer body 220, respectively, or may be formed in the upper, lower, left, and right portions of a rear end of the outer body 220, respectively (two pairs in total). A honeycomb-type partition may be formed in the second coupling protrusion receiving portion 250.

In an embodiment, the second coupling protrusion receiving portion 250 may be formed at a position corresponding to the second coupling protrusion 240. For example, in the case where the second coupling protrusions 240 are formed in the upper and lower portions of a front end of the outer body 220, respectively, as shown in FIG. 6, the second coupling protrusion receiving portions 250 may be formed in the upper and lower portions of a rear end of the outer body 220, respectively. In addition, in the case where the honeycomb-type partition is formed in the second coupling protrusion 240, the second coupling protrusion receiving portion 250 may also have the honeycomb-type partition formed therein. This is due to the fact that when a fluid flows through the honeycomb-type partition formed in the second coupling protrusion 240, the fluid proceeds toward the second coupling protrusion receiving portion 250. The second coupling protrusion receiving portion 250 receives the second coupling protrusion 240, whereby one cladding member 200 is coupled to another cladding member 200.

That is, in FIG. 6, the second coupling protrusions 240 of the cladding member 200 disposed at the rear may be received in the second coupling protrusion receiving portions 250 of the cladding member 200 disposed at the front, so that the front cladding member 200 and the rear cladding member 200 may be coupled.

The surfaces of the cladding members 200 may be coated with hydrocarbon adsorbents. Here, the surface of the cladding member 200 may include both the outer surface and the inner surface of the cladding member 200. The inner surface of the cladding member 200 may include all of the surfaces of the second partitions 230. The hydrocarbon adsorbent has a function of adsorbing and collecting hydrocarbons of the evaporation gases passing through the cladding member 200.

At least one pair of receiving grooves 260 may be provided on the inner surface of the inner body 210 so as to face each other. For example, the receiving groove 260 may be formed in a manner such that a groove having a predetermined depth is provided on the inner surface of the inner body 210 along the longitudinal direction thereof. In an embodiment, the receiving grooves 260 may be integrally formed with the inner body 210.

The cladding members 200 may further include at least one pair of second protrusions 270. At least one pair of second protrusions 270 may be provided on the outer surface of the outer body 220 so as to face each other. For example, the second protrusion 270 may be formed in a manner such that a protrusion having a predetermined height is provided on the outer surface of the outer body 220 along the longitudinal direction thereof.

In an embodiment, the second protrusions 270 may be formed integrally with the outer body 220. For example, the second protrusions 270 may be formed at positions obtained by dividing the outer surface of the outer body 220 into four pieces, respectively, as shown in FIG. 6. The second protrusions 270 are intended for use in coupling the cladding member 200 to another cladding member (not shown) that surrounds the outer surface of the cladding member 200. The aforementioned cladding member, which surrounds the outer surface of the cladding member 200, is formed to have a configuration the same as or a similar to that of the cladding member 200, and is formed to be greater than the cladding member 200 in order to receive the cladding member 200 therein. Therefore, an additional description of the additional cladding member surrounding the outer surface of the cladding member 200 will be omitted.

Meanwhile, the inner body 210 and the outer body 220 of the cladding member 200 may be formed in various shapes (particularly, corresponding to the inner shape of the inner body 210), as well as in a cylindrical shape. In addition, the plurality of second partitions 230 may be formed in various shapes. In this regard, FIGS. 7A to 7E illustrate various modifications of the cladding member 200 and the second partitions 230.

Figure 8:
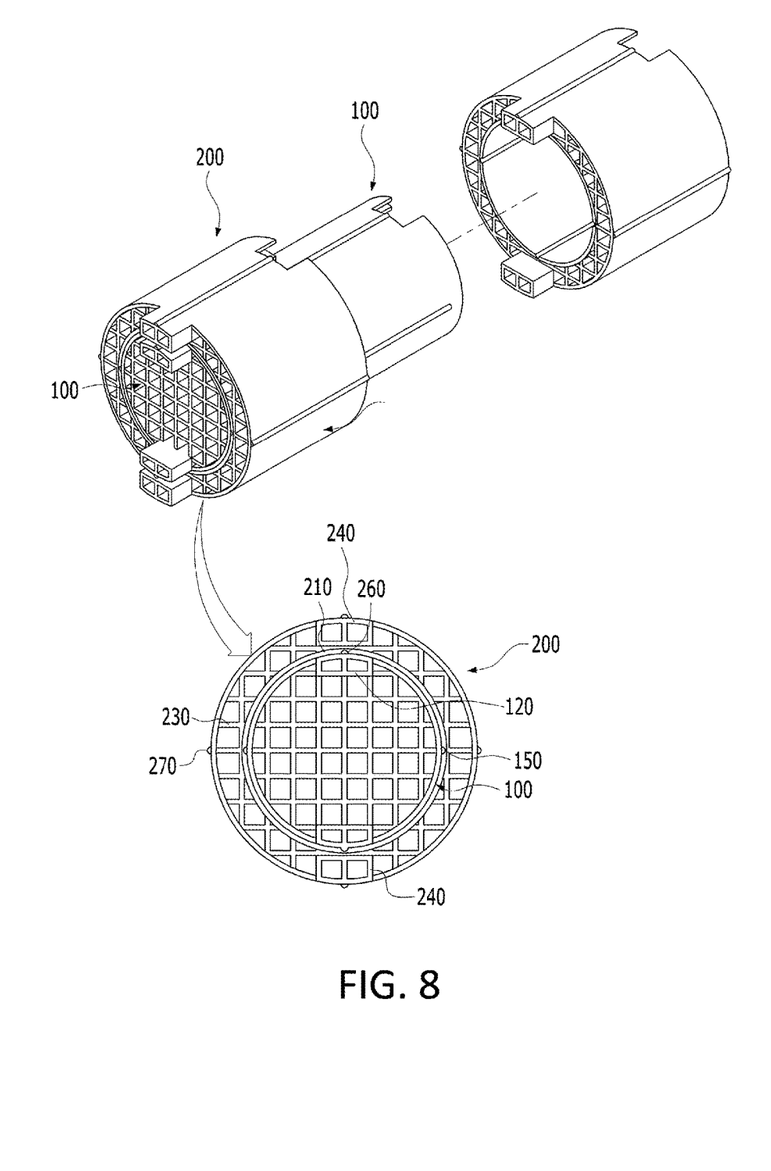
FIG. 8 is a view illustrating a support formed by coupling the core members of FIG. 2 and the cladding members of FIGS. 4A to 4F.

FIG. 8 is a view illustrating a support formed by coupling the core members 100 of FIG. 2 to the cladding members 200 of FIG. 4.

Referring to FIG. 8, in an embodiment of the present invention, the core members 100 of FIG. 2 and the cladding members 200 of FIGS. 4A to 4F may be coupled to form an assembled support for adsorbing hydrocarbons. More specifically, the core member 100 and the cladding member 200 may be coupled in a manner such that the cladding member 200 receives the core member 100 therein.

The number of core members 100 may be the same as the number of cladding members 200. Although FIG. 8 shows two core members 100 and two cladding members 200, any number of cladding members 200 and core members 100 are provided, so long as the numbers are the same. That is, in the case where three core members 100 shown in FIG. 2 are coupled to form an assembled support, three cladding members 200 may also be provided and may be coupled to the outer surfaces of the respective core members 100. The core members 100 and the cladding members 200 may be coupled to each other in the longitudinal direction. As described above, there are many types of canisters, and the width (thickness or diameter) required for the support for adsorbing hydrocarbons employed in the canister may vary depending thereon. According to the assembled support of the present invention, since the support can be formed to conform to the width (thickness) required for the canister by coupling the cladding members 200 to the core members 100, it can be flexibly used depending on the type of canister.

At this time, at least one pair of receiving grooves 260 may be formed on the inner surface of the inner body 210 of the cladding member 200 along the longitudinal direction thereof so as to face each other. The receiving groove 260 plays the role of receiving the first protrusion 150 of the core member 100. When the core member 100 is received in the cladding member 200, the first protrusion 150 of the core member 100 may be received in the receiving groove 260 of the inner body 210 of the cladding member 200. Therefore, the cladding member 200 can be coupled to the outer surface of the core member 100.

As described above, the assembled support, according to the embodiments of the present invention, may have a length and width (thickness) that is adjusted depending on the type of canister.

Basically, it is possible to foam a support to conform to a required length by coupling the core members 100 shown in FIGS. 2 and 3. Further, the cladding members 200 of FIG. 6 may be coupled to the outer surfaces of the core members 100 in order to thereby form a support having a required width (thickness) (see FIG. 8).

Accordingly, the present invention can provide an assembled support for adsorbing hydrocarbons, which is suitable for lengths and widths (thicknesses or diameters) required for various canister housings. Unlike the conventional method of forming a support differently depending on the type of canister, the components constituting a support are modularized and a support is formed by assembling the components in the present invention. Therefore, it is possible to improve process efficiency and to reduce product cost.

The core members 100 and the cladding members 200 constituting the assembled support, according to the embodiments of the present invention, may be formed of a foamed plastic having flame retardancy. The core members 100 and the cladding members 200 may be produced by injection-molding and foam-molding a plastic resin in a typical manner. Since the core members 100 and the cladding members 200 are foamed of a plastic resin, workability is excellent and manufacturing costs can be reduced compared with a support formed of a ceramic or metal material.

In an embodiment, the core member 100 and the cladding member 200 may be coated with a flame retardant composition (flame retardant). This is intended to impart a flame retardant function to the foamed plastic material. In an embodiment, the core member 100 and the cladding member 200 may be coated with a non-organ-based, phosphorus-based, or nitrogen-based flame retardant as a flame retardant used in the foam composition. The flame retardant, for example, may be $Al(OH)_3$, $Mg(OH)_2$, zinc Borate, $Sb_2O_3$, $Sb_2O_5$, H-205 (commercial name), H-201 (commercial name), DPK (commercial name), red phosphorus, ammonium polyphosphate, charcoal, zinc sulfide, expandable graphite, talc, clay, melamine polyphosphate, melamine pyropolyphosphate, piperazine pyrophosphate, or a combination thereof.

Meanwhile, the surfaces of one or more members selected from the core members 100 and the cladding members 200 may be coated with a hydrocarbon adsorbent different from that coated on the surfaces of the remaining members that are not selected. In an embodiment, the hydrocarbon adsorbent coated on the core member 100 may be of a type that is different from that coated on the cladding member 200. In another embodiment, in the case where a support is formed by coupling two core members 100 and two cladding members 200, the hydrocarbon adsorbent coated on the surfaces of the core member 100 and cladding member 200 disposed at the front may be of a type that is different from that coated on the surfaces of the core member 100 and cladding member 200 disposed at the rear. Furthermore, only a part of the core members 100 and the cladding members 200 constituting the whole support may be coated with other kinds of hydrocarbon adsorbents.

Now, the type of hydrocarbon adsorbent will be described below.

In an embodiment, the hydrocarbon adsorbent may be configured as a mixed slurry of activated alumina bearing platinum in a zirconium-based oxide and activated alumina bearing rhodium (a first hydrocarbon adsorbent).

In another embodiment, the hydrocarbon adsorbent may be configured as a mixed slurry of a zeolite-based hydrocarbon adsorbent and a binder, such as an organic polymer, a sol of alumina, silica, or zirconia, an inorganic salt, an organic salt, or a hydrolyzed product of aluminum, silica, or zirconium (a second hydrocarbon adsorbent).

In another embodiment, the hydrocarbon adsorbent may be configured as an activated carbon slurry containing 60 wt % to 70 wt % of activated carbon having a pore size of 20 angstroms or less and 30 wt % to 40 wt % of activated carbon having a pore size of 500 angstroms or more (a third hydrocarbon sorbent).

The above-described hydrocarbon adsorbents may exhibit different hydrocarbon adsorption effects. The hydrocarbon adsorption performance may be improved depending on the type of canister by combining the hydrocarbon adsorbents in different types with respect to the core members 100 and the cladding members 200.

As described above, according to embodiments of the present invention, an assembled support for adsorbing hydrocarbons can be provided to have various lengths depending on the size of the canister housing by coupling a plurality of core members in the longitudinal direction to form a support.

In addition, a support can be provided to have various diameters depending on the size of the canister housing by providing a cladding member to be coupled to the outer surface of the core member in order to thereby adjust the diameter of the support. Therefore, since the support can be applied to various canister models, price competitiveness thereof is excellent. In addition, since the core member and the cladding member are formed of a foamed plastic having flame retardancy, the manufacturing cost is lower than that of a ceramic or metal material, thereby contributing to price competitiveness of the product. Further, since a support may be produced by coupling the core member and the cladding member, which are coated with different hydrocarbon adsorbents, it is possible to easily realize an effect of improving the adsorption efficiency through a combination of two or more hydrocarbon adsorbents.

Embodiments of the present invention have been described above. However, it will be understood that various modifications can be made, such as a simple change in design, omission of some components, or a simple change in usage, according to specific application of the technique by those skilled in the art within the scope of the present invention defined by the appended claims, and it is obvious that such modifications will also fall within the scope of the present invention.

What is claimed is:

1. An assembled support for supporting an adsorbent, comprising:
    two or more core members coupled in a longitudinal direction, each core member including:
    a cylindrical body having a plurality of partitions,
    at least one pair of first coupling protrusions provided on a rim of one end of the cylindrical body,
    at least one pair of first coupling protrusion receiving portions provided on a rim of the other end of the cylindrical body, and
    at least one pair of first protrusions provided on an outer surface of the cylindrical body along the longitudinal direction thereof; and
    two or more cladding members, each cladding member including:
    a cylindrical inner body having an inner surface formed to correspond to an outer surface of the cylindrical body of the core member,
    a cylindrical outer body disposed around the cylindrical inner body to form a plurality of partitions in a space therebetween,
    at least one pair of second coupling protrusions provided on a rim of one end of the cylindrical outer body,
    at least one pair of second coupling protrusion receiving portions provided on a rim of the other end of the cylindrical outer body, and
    at least one pair of receiving grooves formed on the inner surface of the cylindrical inner body along the longitudinal direction thereof,
    wherein the first coupling protrusions and the first coupling protrusion receiving portions are configured to couple the core member to at least one other core member,
    wherein the second coupling protrusions and the second coupling protrusion receiving portions are configured to couple the cladding members to at least one other cladding member,
    wherein one of the core members and one of the cladding members are coupled to each other such that the first protrusions of the core member are received in the receiving grooves of the cladding member, and
    wherein at least the surfaces of the plurality of partitions in the cylindrical body of each core member and at least the surfaces of the plurality of partitions in each cladding member are coated with one or more hydrocarbon adsorbents.

2. The assembled support of claim 1, wherein each cladding member further comprises at least one pair of second protrusions formed on an outer surface of the cylindrical outer body along the longitudinal direction thereof.

3. The assembled support of claim 1, wherein the core members and the cladding members are formed of a foamed and flame-retardant plastic.

4. The assembled support of claim 1, wherein the surfaces of at least one core member selected from the core members or the surfaces of at least one cladding member selected from the cladding members are coated with a hydrocarbon adsorbent different from that coated on the surfaces of the unselected core members or cladding members.

* * * * *